(No Model.)
C. E. WNUCK.
WHEELED VEHICLE.
No. 529,225.                    Patented Nov. 13, 1894.
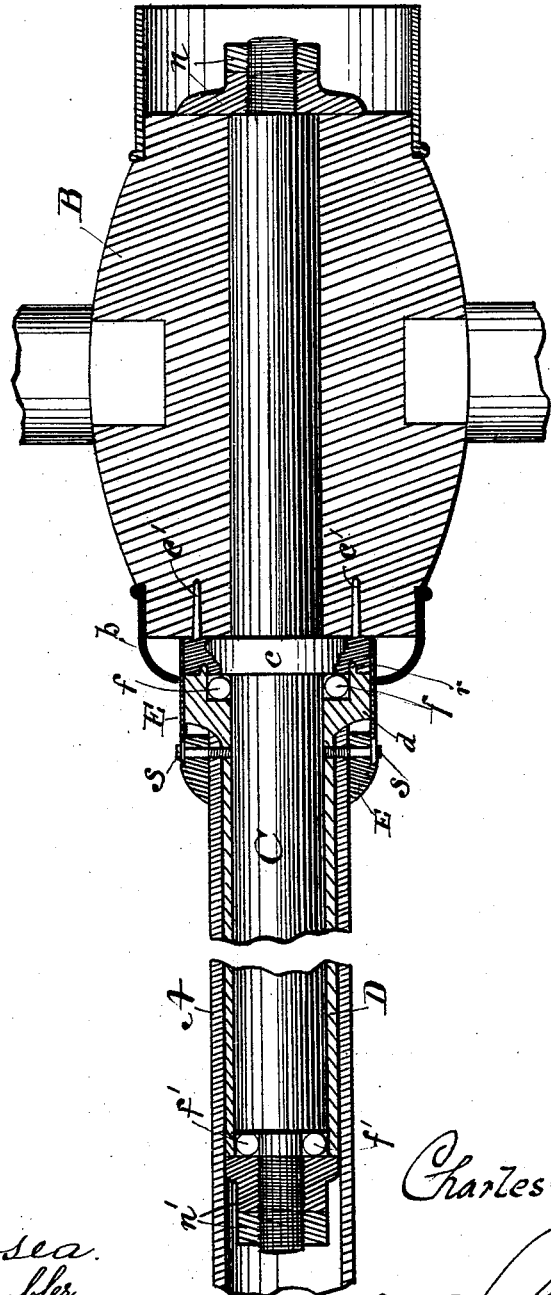
Witnesses:
L. C. Hosea.
Landon Freybler
Charles E. Wnuck
Inventor.
by L. M. Hosea
Attorney.

UNITED STATES PATENT OFFICE.

CHARLES ED. WNUCK, OF CINCINNATI, OHIO.

WHEELED VEHICLE.

SPECIFICATION forming part of Letters Patent No. 529,225, dated November 13, 1894.

Application filed February 23, 1894. Serial No. 501,170. (No model.)

*To all whom it may concern:*

Be it known that I, CHARLES ED. WNUCK, a citizen of the United States, residing at Cincinnati, Ohio, have invented new and useful Improvements in Wheeled Vehicles, of which the following is a specification.

My invention relates to wheeled road-vehicles; its object being to improve the same in respect to the axle and mode of mounting the wheels thereon, to secure better running service, and facilitate construction, repairs, &c.

To these ends, my invention consists in a tubular axle, in combination with a wheel mounted rotatively thereon by means of a spindle rigidly attached to and extending from the wheel in the projection of its axis; and in the constructive features hereinafter described, whereby the invention is most efficiently carried out.

My invention is illustrated in the accompanying drawing, showing a portion of a tubular axle with one of the wheels attached,—the parts being sectioned to show details of construction.

Referring now to the drawing: A, designates the tubular axle, and, B, the wheel hub. For convenience and economy, I here show the invention in form adapted to the ordinary wooden wheel as furnished in the market. In the wheel aperture I insert a steel spindle, C, proportioned to a driving fit with the wheel hub, which abuts inwardly against an enlargement or collar, $c$, of the spindle, from which a number of spike-points, $c'$, project in concentric parallel relation with the spindle, and enter the rear face of the hub to secure it rigidly against rotation. The hub is held to place by right and left screw nuts, $n$, at the forward end of the spindle. The rear end of the spindle is telescoped in a tubular casing, D, in which it rotates; and the casing is telescoped in the tubular axle, A, being held against inter-rotation by two or more set screws, $s$, passed first through a cylindrical shield or collar, E, encircling the axle, A, and thence through the shell of the axle, A, and of the intermediate tube, D. The wheel-end of the tube, D, is enlarged as at, $d$, to inclose an annular cavity around the spindle, C, in which are placed cylindrical or spherical friction-rolls or spheres, $f$, constituting "ball bearings." The outer end-face of the tube, D, is provided with a concentric rib $r$, and the contiguous face of the collar, $c$, (of the spindle, C) with a corresponding annular recess to make a dust-proof joint; and to the same end, the collar or shield, E, is extended forward over the enlargement, $d$, and collar, $c$, and abuts against the rear face of the hub, B. A shield, $b$, attached to the hub incloses the rear face of the latter making a close rotating joint with the shield, E.

The extreme rear end of the spindle, C, is reduced in diameter just prior to emerging from the tube, D; and the annular space thus formed, is occupied by friction-rolls or spheres, $f'$, which are held in place by right and left nuts, $n'$, at the end of the spindle, C, bearing against the end of the tube, D. These nuts, $n'$, constitute, as will be observed, the holding element to retain the wheel and its spindle longitudinally in connection with the tubular axle; co-operating, in this function, with the set screws, $s$, which retain the tube, D, in place,—friction-washers being provided at the movable contact bearings.

The spindle, C, being rigidly attached to the wheel-hub, B, rotates within its tube, D, upon and within the circle of its friction-roll bearings, $f$, $f'$. The spindle may extend any desired distance within the tubular axle, A, less than half the length of the latter. (In practice a length of about eighteen inches is commonly employed.) The intervening parts are thus securely incased in a practically air- and dust-proof casing. Consequently lubrication remains efficient a very long time. Moreover, as the bearing is taken upon the rollers, and a rolling friction is alone to be provided for, very little lubrication is required.

Upon loosening the set screws, $s$, the wheel and its spindle are removed with the incasing tube, D, and the latter is removed by first taking off the nuts, $n'$. It will be seen that the process of taking apart and putting together is simple and easily comprehended,—but two fastening elements being used, namely: the set screws, $s$, and the spindle-nuts, $n'$.

I claim as my invention and desire to secure by Letters Patent of the United States—

1. In a vehicle the combination with a tubular axle, of a wheel, a spindle projecting rigidly therefrom, an open-ended spindle casing through which the spindle extends, roller bearings surrounding the spindles at both ends of the casing and a holding nut at the rear projecting end of the spindle—the spindle casing adapted to removably fit the tubular axle and be inserted in or removed therefrom without detaching the wheel from its spindle, substantially as set forth.

2. The combination of a cylindrical tubular axle; a removable tubular spindle-casing fitting therein; a wheel-spindle having a rotating fit in said spindle-casing; a wheel rigidly attached to the end of said spindle: a series of friction rolls surrounding the spindle within the forward end of the casing: a second series of friction rolls surrounding a reduced end of the spindle within the rear end of the casing: a collar on the spindle abutting against the forward end of the casing: and a removable nut upon the rear projecting end of the spindle abutting against the casing, substantially as set forth.

3. The combination of the tubular axle, the spindle-casing, the spindle (with wheel attached) the collar, E, and set screws, s, passing through the collar, tubular axle, and spindle-casing to secure these parts rigidly together substantially as set forth.

4. The combination of the spindle (with wheel attached) the casing, the roller bearings, and the nuts, $n'$; constituting a structure adapted to be inserted in the tubular axle and removably held by the set screws, s, substantially as set forth.

In testimony whereof I have hereunto set my hand in the presence of two subscribing witnesses.

CHARLES ED. WNUCK.

Witnesses:
L. C. HOSEA,
LANDON FREYBLER.